United States Patent [19]

Hively et al.

[11] Patent Number: 5,380,042

[45] Date of Patent: Jan. 10, 1995

[54] PROTECTIVE CAGE FOR FUEL TANK INSTALLED BETWEEN VEHICLE SIDE MEMBERS

[75] Inventors: Brad A. Hively; Patrick G. Gerardot; Michele M. Wegscheid, all of Fort Wayne, Ind.

[73] Assignee: Navistar International Transporation Corp., Chicago, Ill.

[21] Appl. No.: 170,541

[22] Filed: Dec. 20, 1993

[51] Int. Cl.⁶ .............................................. B60K 15/07
[52] U.S. Cl. ............................ 280/834; 220/562; 220/401; 296/188; 224/42.41
[58] Field of Search ................ 280/834, 830, 784; 220/562, 401; 224/42.41; 296/188, 38; 180/69.1, 346

[56] References Cited

U.S. PATENT DOCUMENTS

| 1,658,923 | 2/1928 | Heiney | 280/834 |
| 1,760,457 | 5/1930 | Walker | 280/830 |
| 1,970,724 | 8/1934 | Arnold | 280/834 |
| 2,607,518 | 8/1952 | Cohen | 220/401 |
| 2,758,845 | 8/1956 | Doyle et al. | 280/834 |
| 3,730,384 | 5/1973 | Ramme | 220/562 |
| 4,090,721 | 5/1978 | Wedin et al. | 280/784 |
| 4,357,027 | 11/1982 | Zeitlow | 280/834 |
| 4,610,453 | 9/1986 | Collier | 280/834 |

FOREIGN PATENT DOCUMENTS

| 0190023 | 10/1984 | Japan | 280/834 |
| 0101227 | 4/1989 | Japan | 280/834 |
| 0115726 | 5/1989 | Japan | 280/834 |
| 5065032 | 3/1993 | Japan | 280/834 |

Primary Examiner—Margaret A. Focarino
Assistant Examiner—Peter C. English
Attorney, Agent, or Firm—Dennis K. Sullivan

[57] ABSTRACT

A fuel tank mounting and protective cage for vehicles such as school buses including side structures and a bottom shelf structure, each of these structures being weldments constructed of low carbon, high strength steel tubing having rectangular cross-sections. The bottom structure is connected to the side structures by bolt assemblies, preferably disposed in laterally offset parallel rows, to produce stiff joints between the sections with the result that there is less rotation and localized deformation of the protection cage in the event of an accident. Hold down devices are carried by the bottom shelf structure for securing the fuel tank directly to the bottom shelf structure so that the bottom shelf and fuel tank may be removed as a unit for service.

18 Claims, 3 Drawing Sheets

PROTECTIVE CAGE FOR FUEL TANK INSTALLED BETWEEN VEHICLE SIDE MEMBERS

CROSS REFERENCE TO RELATED APPLICATION

This application is related to application Ser. No. 08/060,457 filed May 11, 1993 and assigned to the assignee hereof.

BACKGROUND OF THE INVENTION

The present invention relates generally to a mounting and protective cage for a fuel tank that is mounted between the side members of a vehicle such as a school bus.

An objective of this invention is to provide a vehicle, such as a school bus, with a large fuel tank, in the 100 gallon capacity range, that will be protected in the event of a crash, even at impact speeds of up to 30 mph from any direction, and otherwise meet Section 301 of the Federal Motor Vehicle Safety Standards. The fuel tank mounting and protective cage of this invention is intended to provide this degree of protection for any of the several combinations of suspension systems and tires that may be offered by the manufacturer of the vehicle chassis.

The side members or frames of vehicles, such as school buses, are constructed of substantial C-shaped steel beams. The area between these C-shaped steel beams or side members is thus well protected. Much of this protected area is already occupied by the exhaust system, the drive to the rear axle and the brake lines. However, a portion of this protected area rearward of the rear axle is available to receive a fuel tank.

The vehicle floor extends across the top flange of the side members and thus the fuel tank can not extend above the side members. Thus, to accommodate a 100 gallon fuel tank rearward of the rear axle, the tank must extend below the lower flange of the side members. However, there are limits to the distance below the side members and the distance to the rear of the vehicle that the fuel tank and its protective cage can extend.

The angle between the ground line and a line extending from the ground/tire interface of a rear tire and the lower edge of the rear bumper is called the departure angle. Nothing should extend down from the underside of the vehicle that violates the plane of this departure angle. Stated in another way, when the front wheels of a vehicle encounter an incline and the rear bumper moves toward the pavement, the rear bumper should scrape the pavement before anything else that extends down from the underside of the vehicle. Thus, the location of the bottom rear lateral edge of the mounting and protective cage is limited by the angle of departure.

The ease of assembly of the protective cage to the vehicle chassis and removal from the chassis for service are important attributes of this invention. Since the areas outwardly of the side members may be used for luggage compartments, the outer surfaces of the side members become inaccessible after installing the bus body and luggage compartments. Thus, removing the fuel tank for service must be possible without access to the bolts or other connecting devices that are located on the outer surfaces of the side members.

FIG. 1 illustrates a prior art mounting and protective cage for a fuel tank 10 that is mounted between the side members 12. It is apparent from FIG. 1 that, if this prior art device is struck with sufficient force at the location indicated by the arrow A in this view, the sheet metal liners 14 will bend causing the fuel tank 10 to shift and collide with the mounting and protective cage. The steel beams 28 that connect the lower edges of the liners 14 and extend laterally under the fuel tank 10 and the end plate 18 may shift, as a parallelogram, in the event of a side crash. This parallelogram type movement is permitted because the joint between the sheet metal liners 14 and the steel beams 28 has very little resistance to bending. This joint is formed by a bend 15 in the sheet metal liners 14 which can be bent in either direction. Thus, this prior art protective cage may be vulnerable in situations in which a side crash impacts below the lower flange of the side members.

For the foregoing reasons, there is a need for a fuel tank protective cage for mounting a fuel tank of the type that extends between and below the vehicle side members that protects the fuel tank from crashes that impact the protective cage below the lower flanges of the vehicle side members.

SUMMARY OF THE INVENTION

The present invention is directed to a device that satisfies the need for mounting a fuel tank between the vehicle side members and affords protection to the fuel tank from crashes that impact the protective cage below the lower flange of the side members.

The protective cage of the invention is provided with a joint between the side sections and the bottom shelf that resists bending so that the cage absorbs more impact energy in the event of a crash than the prior art devices and will transfer the forces from a crash to the vehicle's side members rather than collapsing the protective cage against the fuel tank.

The protective cage and mounting device of this invention consist of two side structures and a bottom shelf structure. Each of these structures being weldments constructed of low carbon, high strength steel tubing having rectangular cross-sections. Each structure is generally rectangular in shape and includes diagonally extending tubular braces. The bottom shelf structure is bolted to the lower edge of both side structures, forming joints that resist bending. As a result, there is less rotation and localized deformation of the protective cage in the event of an accident. Hold down devices are carried by the protective cage for securing the fuel tank directly and solely to the shelf section of the protective cage.

BRIEF DESCRIPTION OF THE DRAWINGS

Other objects and advantages of the invention will become more apparent upon a perusal of the detailed description thereof and upon reference to the drawings, in which.

DETAILED DESCRIPTION OF THE PREFERRED EMBODIMENT

Figure 1:
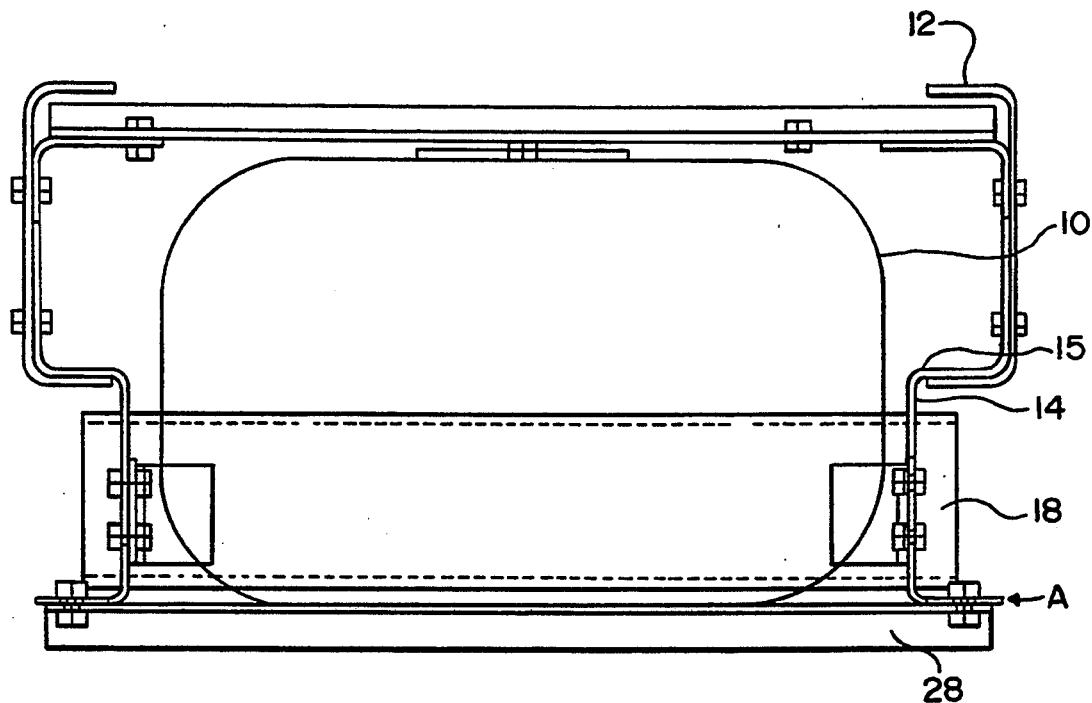
FIG. 1 is a view of a prior art fuel tank mounting mechanism and protective cage.
Figure 2:
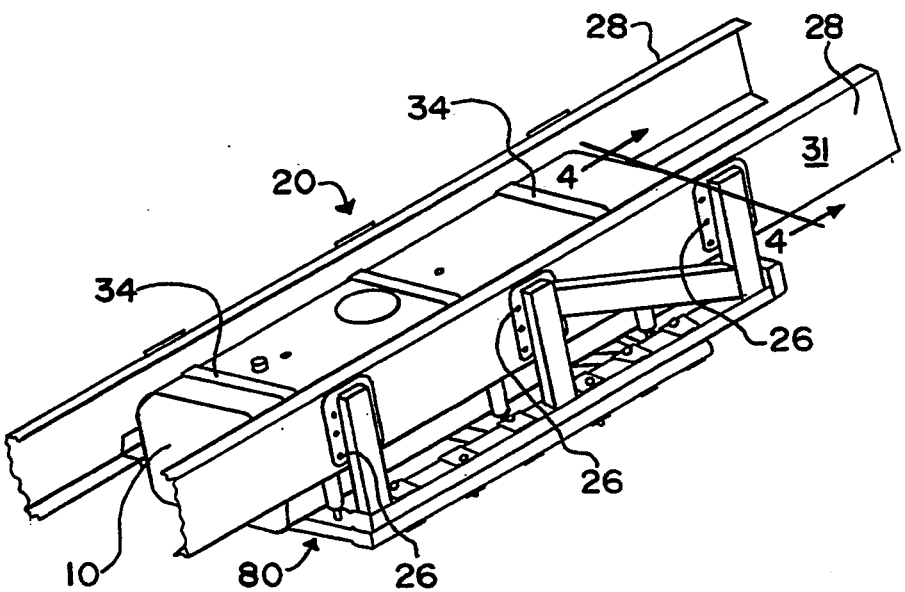
FIG. 2 is a perspective view of applicants' fuel tank mounting and protective cage, with a fuel tank mounted thereon, secured to the vehicle side members.
Figure 3:
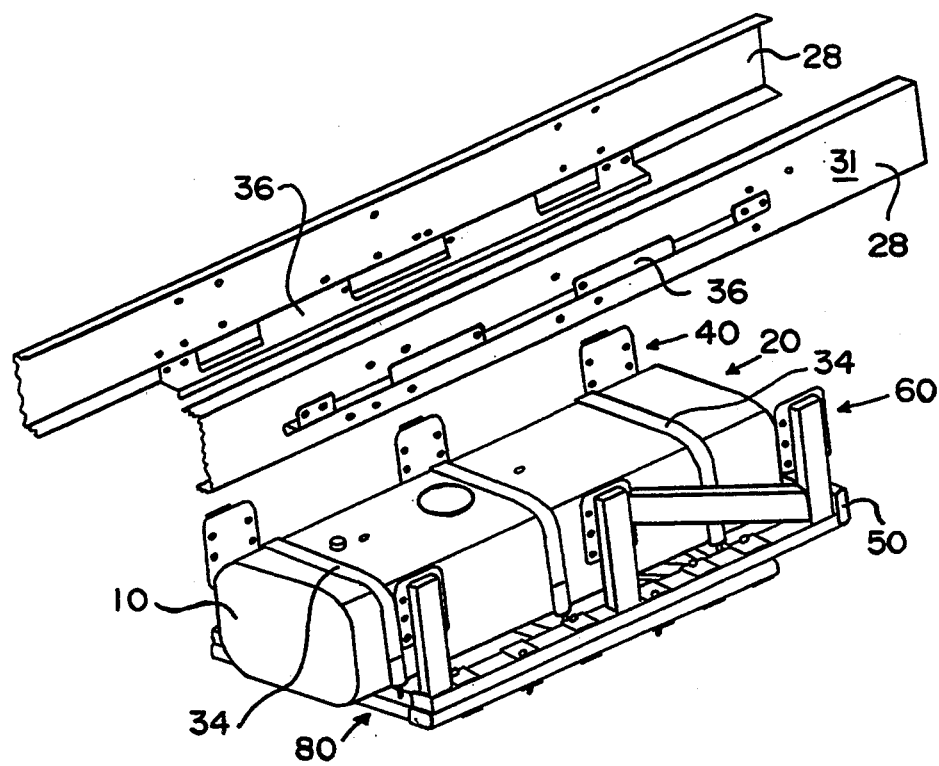
FIG. 3 is an exploded view of FIG. 2.

Referring now to FIG. 2 and to FIG. 3, a fuel tank 10 is secured to a bottom shelf 80 of a fuel tank mounting and protective cage 20. Side structures 40 and 60 of the fuel tank mounting and protective cage 20 are secured, for example, by bolt assemblies 26, to vehicle side members 28. FIG. 2 shows the fuel tank 10 secured in place on the bottom shelf 80 by strap type hold-down members 34.

Figure 4:
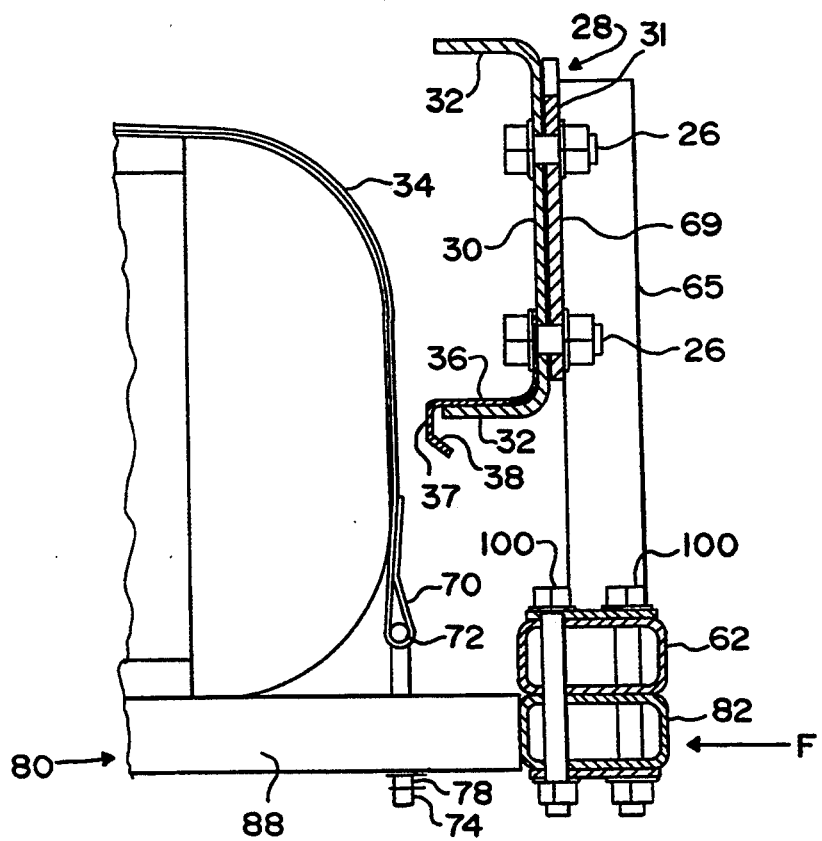
FIG. 4 is an enlarged cross section view taken along lines 4—4 of FIG. 2.

As shown in FIG. 4, the vehicle side members 28 are formed of C-shaped steel beams made up of a vertically extending web 30 and a pair of inwardly extending flanges 32. The vertically extending web 30 has outwardly facing vertical surfaces 31 to which the fuel tank mounting and protective cage 20 is secured. The side members 28 extend the entire length of the vehicle chassis and function as the frame on which all other major components, such as the engine (not shown) and the front steerable wheels (not shown) are mounted. The chassis also includes rear wheels 12 mounted on a rear axle (FIG. 7) that support the side members 28.

A sheet metal liner 36, best seen in FIG. 3, is secured to each of the inwardly facing vertical surfaces of webs 30 and include a shield portion 38 that covers the inner edge of the lower inwardly extending flanges 32 to prevent the inner edges of the flanges 32 from piercing the fuel tank 10 in the event of a crash of a magnitude sufficient to shift a side member 28 into contact with the fuel tank 10 since the flat surface 37 of liner 36 rather than the edge of flange 32 will contact the fuel tank thereby spreading the force of contact over the large flat surface 37 rather than the relatively small surface area of the flange edge. The likelihood of rupturing the fuel tank 10 is thus significantly reduced by liner 36 which extends longitudinally along the entire length of the fuel tank 10 and is secured to the inner face of web 30 by bolt assemblies 26.

The fuel tank mounting and protective cage 20 is fabricated from right and left hand side structures 40 and 60, which are mirror images of each other, and a bottom shelf 80. The bottom shelf 80 and structures 40 and 60 are fabricated as separate weldments.

Figure 5:
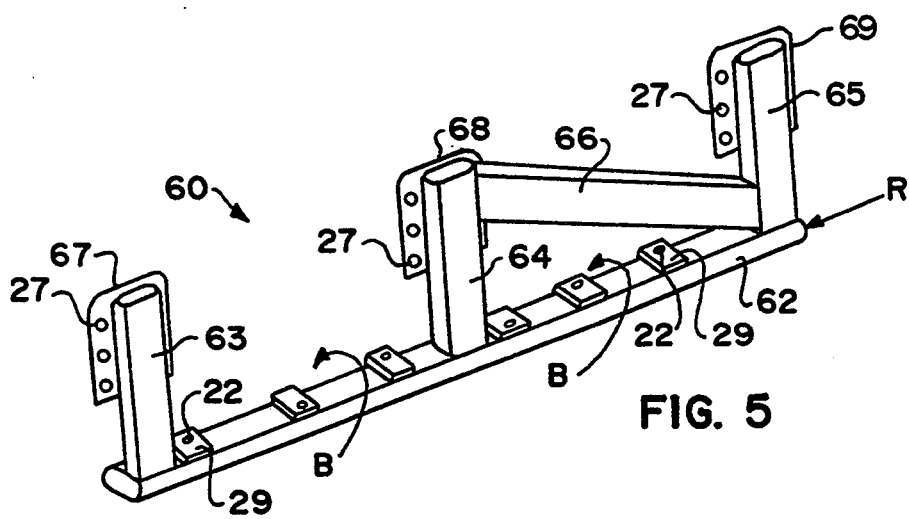
FIG. 5 is a perspective view of the side structure weldment.

As is shown in FIG. 5, the left hand side structure 60 has a generally rectangular shape, the lower longitudinal edge of which is formed of a low carbon high strength steel tubing 62 of rectangular cross-section, the long side of the rectangular cross-section extending horizontally and the short side extending vertically. Three upright posts 63, 64 and 65, also made of low carbon high strength steel tubing having a rectangular cross-section, are welded to the upper horizontal surface of steel tubing 62 with their long sides extending longitudinally and their short sides extending transversely. To prevent racking of the structure, a diagonal brace 66 extends from the upper rear of upright post 64 to the lower front of upright post 65 and is secured to the upright posts by welding.

As a result of this construction, the side structures 40 and 60 are very strong in resisting deformation caused by any force or moment that is applied to them. Of particular interest are forces applied from the rear as indicated by the arrow R and bending moments of the type indicated by the arrows B in FIG. 5.

Flat mounting plates 67, 68 and 69 are secured, by welding, to the upper inner surfaces of upright posts 63, 64 and 65. Each mounting plate has holes 27 formed therethrough, that correspond to holes formed in the webs 30 of the side members 28 and to holes formed in the liners 36. Bolts 26 are inserted through some of these aligned holes and torqued down to provide a rigid connection between the mounting and protective cage 20 and the vehicle side members 28. It is important that the mounting plates 67, 68 and 69 be securely connected to the side members 28 because this is the sole connection of the mounting and protective cage 20 to the vehicle. The force of any collision that impacts on the mounting and protective cage 20 is transferred to the vehicle frame through this connection.

On the upper horizontal surface of steel tubing 62, there are welded a plurality of reinforcing plates 29. Bolt holes 22 are formed through reinforcing plates 29 and through steel tubing 62 to attach the bottom shelf 80 to the side structures 40 and 60.

Figure 6:
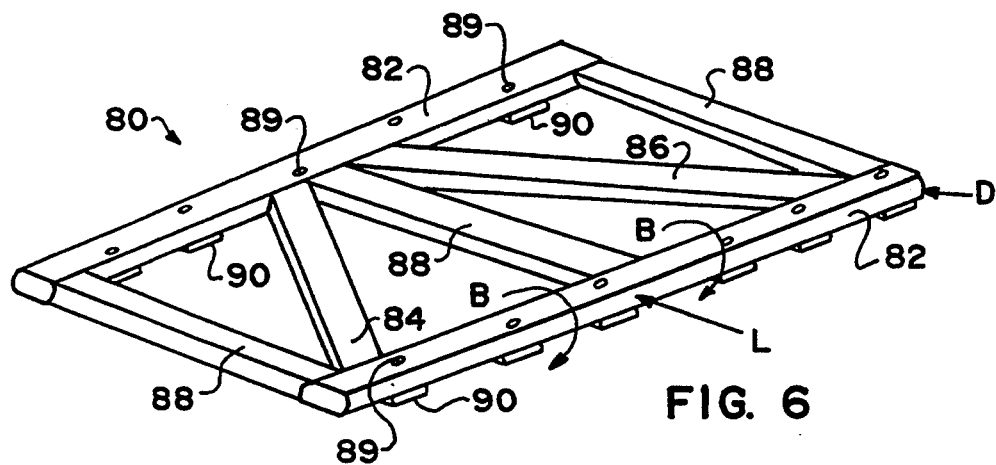
FIG. 6 is a perspective view of the bottom shelf weldment.

The bottom shelf structure 80 is shown in FIG. 6. The bottom shelf 80 is a welded truss structure including a pair of parallel longitudinally extending side tubes 82 that lie in a horizontal plane. The pair of parallel side tubes 82 are interconnected by a front diagonal tube 84, a rear diagonal tube 86 and three transversely extending tubes 88. Tubes 82, 84, 86 and 88 all have rectangular cross sections and are all arranged with their long axes horizontal which results in the bottom shelf 80 being very strong in resisting deformation caused by any force or moment applied to it. Of particular interest is the shelf's ability to withstand lateral forces and bending moments of the type indicated by arrows L and B in FIG. 6. Also, the bottom shelf 80 will withstand a considerable horizontal force, such as shown by arrow D, applied diagonally at its corners. A plurality of reinforcing plates 90 are welded to the bottom horizontal surfaces of longitudinally extending side tubes 82 and bolt holes 89 are formed through reinforcing plates 90 and the tubes 82. The bolt holes 89 that extend through tubes 82 are aligned with the bolt holes 22 that extend through reinforcing plates 29 and tubes 62. Bolt assemblies 100 extend through aligned bolt holes 22 and 89 to securely fasten bottom shelf 80 to side structures 40 and 60. Bolt holes 22 and 89 are formed along two parallel lines, each alternate bolt hole being in the other parallel line of bolt holes. This arrangement of parallel lines of bolt holes is best seen in FIG. 4. This method of bolting the bottom shelf 80 to the side structures 40 and 60 produces a stiff joint between the tubes 62 of the side structures and the tubes 82 of the bottom shelf that is extremely resistant to bending moments. This double row of bolt assemblies 100 prevents the tubes 62 or 82 from moving laterally of the other tube and also from rocking about a longitudinal extending line as would be possible if a single row of bolts were used to form this joint.

The bend resistant joint between tubes 62 and 82 is crucial to the present invention. The C-shaped vehicle side members are inherently limber in torsion. For example, if bottom shelf 80 were not secured to side structure 60, as seen in FIG. 4 and a collision force in the lateral direction was concentrated in the direction of arrow F, side member 28 would twist in the clockwise direction. This inherent attribute of the side members 28 are the result of their channel cross-section. By providing joints between the bottom edge of the side structures 40 and 60 and the longitudinal edges of the bottom shelf 80 that are virtually impossible to bend, twisting of the side members 28 is prevented and the force of arrow F is thus transferred up upright post 63, 64 and 65 from both tubes 62 to the side members 28. If there were only a single row of bolts connecting tubes 82 to tubes 62, there would exist the possibility of some relative movement between tubes 82 and 62 and thus the possibility of some movement of the upright post 63, 64 and 65 toward the fuel tank 10.

Figure 7:
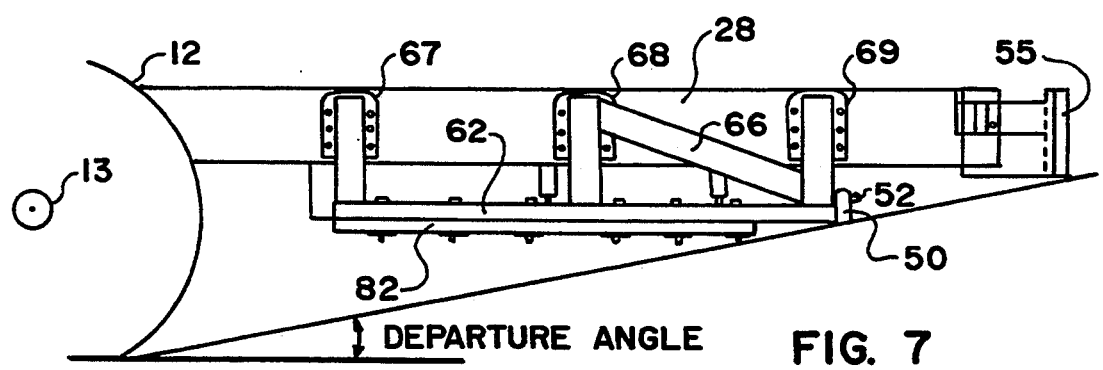
FIG. 7 is a side view of the vehicle illustrating the departure angle.

Referring now to FIG. 7 where the vehicle's departure angle is represented. The angle between the ground line and a line extending from the ground/tire interface of a rear tire and the lower edge of the rear bumper 55 is called the departure angle. Nothing should extend down from the underside of the vehicle that violates the plane of this departure angle. The mounting and protective cage 20 can be sized and located such that it does not penetrate the plane of the vehicle's departure angle. However, in the particular vehicle illustrated in FIG. 7, the location of the lower transverse edge of the mounting and protective cage 20 is controlled by the plane of the departure angle and thus the bottom shelf 80 is shorter than the side structures 40 and 60, terminating forwardly of the rear end thereof. Accordingly, a cross member 50 is connected by bolts 52 across the bottom rear corners of the side structures 40 and 60 and functions, in conjunction with the bottom shelf 80, to prevent the side structures 40 and 60 from moving toward each other and also to protect the portion of the rear end of the fuel tank 10 which may overlap the bottom shelf 80 from objects which could otherwise enter between the side structures 40 and 60 from the rear of the vehicle.

The welded construction of the bottom shelf 80 and side structures 40, 60 and the securement of these weldments into an integrated assembly, by bolt assemblies 100, provides for stiff joints that have a high resistance to bending with the result that there will be less rotation and localized deformation of the protective cage in the event of an accident. Additionally, these stiff joints permit the integrated protective cage assembly, together with cross member 50, to prevent lateral incursions of the side members 28 toward the fuel tank in an accident without the provision of cross-ties therebetween above the tank. Thus, the entire space between the side members 28 remains available for the fuel tank.

As previously stated, the mounting and protective cage 20 is secured to the side members 28 and the fuel tank 10 is secured to the mounting and protective cage 20 and is thus not directly connected to the side members 28 to minimize the relative motion between the fuel tank 10 and the mounting and protective cage 20 and reduces the probability and extent of fuel tank deformation in the event of an accident. The hold down members 34 secure the fuel tank 10 to the bottom shelf 80 of the mounting and protective cage 20 rather than to the side members 28 so that the mounting and protective cage 20 and the fuel tank 10 become an integral unit rather than separate units between which there can be relative motion.

The hold down members 34 seen in FIGS. 2, 3 and 4, can be formed from steel straps that are folded over to form loops 70 at each end. In the embodiment disclosed, three hold down members 34 are utilized; however, additional hold down members 34 could be used if deemed necessary. A threaded connector 72 extends through each loop 70 and through transverse tubes 88. The free ends 74 of the connectors 72 extend through holes formed in the transverse tubes 88. Lock nuts 78 are threaded on the free ends of the connectors 72 and bear against the bottom surface of the transverse tubes 88. A vinyl lining can be applied to the under surface of the hold down members 34 to protect the fuel tank 10. The lock nuts 78 can be tightened down until sufficient pressure has been applied by the hold down members 34 to securely fasten the fuel tank 10 to the bottom shelf 80 of the mounting and protective cage 20.

During initial assembly to the vehicle chassis, the mounting and protective cage 20 with the fuel tank 10 securely fastened to the bottom shelf 80 can be handled as a modular unit rather than being connected to the vehicle chassis as individual parts. This has the advantageous result of a simpler and quicker assembly process. The only other non-electrical connections between the modular unit and the vehicle are the fuel lines that extend from the fuel tank 10 to the engine and the tube for filling the fuel tank.

It should be noted that the mounting and protective cage 20 is assembled to the vehicle chassis when the chassis is being built at which time the outer vertical surfaces 31 of the side members 28 are accessible. However, once a school bus body is assembled to the chassis, luggage storage compartments will generally be located adjacent the outer vertical surfaces 31 of side members 28, thus preventing access to bolt assemblies 26. If the fuel tank requires servicing or replacement, it is not feasible to remove the side structures 40 and 60 from the vehicle side members 28. However, the bolt assemblies 100 securing the bottom shelf 80 to the lower edges of the side structures 40 and 60 are accessible and thus the fuel tank 10 and shelf 80 can be removed as a unit from beneath the vehicle for servicing.

Although the present invention has been described in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. In combination with a vehicle of the type having a pair of longitudinally extending side members each having an inwardly extending flange and a vertically extending web section connected to said flange that presents an outwardly facing vertical surface to which a fuel tank mounting and protective cage is secured, a fuel tank mounting and protective cage, comprising:

a right side structure having a generally rectangular shape and including flat mounting plates that are secured to an outwardly facing vertical surface of a side member, said right side structure having a lower longitudinal edge;

a left side structure having a generally rectangular shape and including flat mounting plates that are secured to an outwardly facing vertical surface of the other side member, said left side structure having a lower longitudinal edge;

a shelf structure having a generally rectangular shape;

said right and left side structures and said shelf structure being weldments constructed mainly from low carbon, high strength steel tubing having a rectangular cross-section;

the lower longitudinal edges of said right and left side structures, extending below said side members, formed from said steel tubing and having flat downwardly facing surfaces;

said shelf structure including longitudinal extending edges formed of said steel tubing and having flat upwardly facing surfaces;

said shelf structure being dimensioned such that said flat upwardly facing surfaces align with said flat downwardly facing surfaces of the right and left side structures; and securing devices, accessible from beneath said shelf structure, releasably securing said flat upwardly facing surfaces flush against said flat downwardly facing surfaces to form bend resisting joints between the longitudinal extending edges of said shelf structure and the lower longitudinal edges of said right and left side structures.

2. The invention as set forth in claim 1 wherein said steel tubing cross-section has a long side, said flat upwardly and downwardly facing surfaces are formed from the long sides of the steel tubing having a rectangular cross-section.

3. The invention as set forth in claim 1 wherein said securing devices include a series of bolt assemblies extending through aligned bolt openings formed in said steel tubing forming the lower longitudinal edges of said right and left side structures and the longitudinal extending edges of said shelf structure.

4. The invention as set forth in claim 3 wherein said series of bolt assemblies are distributed between aligned laterally spaced parallel rows to increase the bend resistance of the joint.

5. The invention as set forth in claim 3 wherein reinforcing plates are secured to the upper surfaces of the steel tubing forming the lower longitudinal edges of said right and left side structures, said bolt openings passing through said reinforcing plates.

6. The invention as set forth in claim 3 wherein reinforcing plates are secured to the lower surfaces of the steel tubing forming the longitudinal extending edges of said shelf structure, said bolt openings passing through said reinforcing plates.

7. The invention as set forth in claim 1 wherein said right side structure, left side structure, and shelf structure are truss structures of sufficient strength to independently resist bending such that upon the vehicle being engaged in an accident in which an impact force is directed against the protective cage, the force of the impact will be absorbed by these structures and transferred to the vehicle side members through said flat mounting plates.

8. The invention as set forth in claim 7 wherein, each of said right and left side structures include a plurality of horizontal members and a plurality of vertical members forming said generally rectangular shape and steel tubing extending diagonally between one said plurality of horizontal members and one of said plurality of vertical members.

9. The invention as set forth in claim 7, wherein said shelf structure includes a plurality of longitudinal members and a plurality of transverse members forming said generally rectangular shape and steel tubing extending diagonally between said plurality of longitudinal members.

10. The invention as set forth in claim 1 further including a fuel tank secured only to said shelf structure, said tank having longitudinally extending walls spaced inwardly from the inner edges of the side member flanges.

11. The invention as set forth in claim 10 wherein longitudinally extending sheet metal liners are secured to the inner surfaces of the web sections of said side members and extend downwardly and over the inner edges of the lower flanges of said side members to shield the fuel tank from damage by the inner edges of the flanges.

12. The invention as set forth in claim 1 wherein said right and left side structures have rear ends and a laterally extending cross member is secured between said rear ends of said right and left side structures adjacent said lower longitudinal edges.

13. A vehicle comprising:

a mobile frame having a rear axle mounted thereto and including a pair of longitudinally extending C-shaped side members, each having a web section extending vertically to provide an outwardly facing vertical surface;

a fuel tank mounting and protective cage secured to the outwardly facing vertical surfaces of the side members rearwardly of said rear axle, said fuel tank mounting and protective cage including side structures mounted respectively to said side members and depending therefrom, said side structures including longitudinally extending lower edge members spaced below said side members, said side structures being weldments constructed of low carbon, high strength steel tubing having rectangular cross-sections, and a bottom shelf member removably attached to and interconnecting said lower edge members of said side structures, said bottom shelf member being a horizontally disposed welded truss constructed of low carbon, high strength steel tubing of rectangular cross-section; and a fuel tank mounted to said bottom shelf member within said fuel tank mounting and protective cage.

14. The invention as set forth in claim 13 in which said bottom shelf member includes longitudinally extending parallel side tubes interconnected by end tubes and a center tube, said end and center tubes being disposed perpendicular to said side tubes to form a front section and a rear section, a front diagonal tube extending diagonally across said front-section between and secured to said parallel side tubes and a rear diagonal tube extending diagonally across said rear section between and secured to said parallel side tubes.

15. The invention as set forth in claim 14 and said lower edge members providing tubes planar surface and said parallel side tubes having a planar surface, and fastening means for removably maintaining said planar surfaces in confronting relation.

16. The invention as set forth in claim 15 and said fastening means comprising bolt assemblies passing through said lower edge members of said side structures and said parallel side tubes of said shelf member.

17. The invention as set forth in claim 15 and said fastening means comprising a plurality of bolt assemblies distributed between laterally spaced parallel rows along and passing through said lower edge members of said side structures and said parallel side tubes of said shelf member.

18. The invention as set forth in claim 15 in which the tubes, having rectangular cross-sections having long axes, of said shelf member have their long axes arranged horizontally.

* * * * *